United States Patent [19]
Rejsa

[11] 3,933,068
[45] Jan. 20, 1976

[54] TRIM REMOVAL BELT FOR DOUGH CUTTING APPARATUS

[75] Inventor: Jack J. Rejsa, Golden Valley, Minn.

[73] Assignee: The Pillsbury Company, Minneapolis, Minn.

[22] Filed: July 26, 1974

[21] Appl. No.: 492,080

[52] U.S. Cl. .......... 83/168; 53/123; 83/86; 83/100; 83/112; 83/167; 83/422; 198/203; 198/230
[51] Int. Cl.² ...................... B26D 7/08; B65G 23/18
[58] Field of Search .......... 198/203, 208, 230, 229; 83/97, 86, 98, 99, 100, 112, 155, 167, 326, 422, 266, 168; 53/123, 244

[56] References Cited
UNITED STATES PATENTS

| | | | |
|---|---|---|---|
| 2,279,420 | 4/1942 | Thum | 83/167 X |
| 2,664,833 | 1/1954 | Armstrong et al. | 53/123 |
| 2,707,922 | 5/1955 | Ferguson et al. | 83/326 X |
| 2,873,843 | 2/1959 | Wilson | 198/203 X |
| 2,941,341 | 6/1960 | Clinton | 53/123 |
| 3,154,986 | 11/1964 | Reid | 83/326 X |

Primary Examiner—J. M. Meister
Assistant Examiner—W. D. Bray
Attorney, Agent, or Firm—James V. Harmon; Michael D. Ellwein

[57] ABSTRACT

The invention deals with a trim removal system for equipment used in cutting biscuits from a continuously moving strip of dough. The cutter consists of an endless conveyor entrained over a pair of spaced sprocket assemblies positioned beneath the advancing dough sheet. Dough cutting rings project upwardly from the conveyor. As the dough is advanced it is pressed onto the rings. A biscuit size piece passes through the center of each ring and is deposited in a container positioned to receive it. The trim removal belt is provided with a multiplicity of holes of just the proper size to fit over the rings so that the upper run of the belt rests in contact with the upper surface of the conveyor. Guides are provided for bringing a belt into engagement with the upper run of the conveyor at an oblique angle and for raising the belt and trim from the surface of the conveyor at a predetermined oblique angle. The trim is then returned for remixing with fresh dough.

11 Claims, 4 Drawing Figures

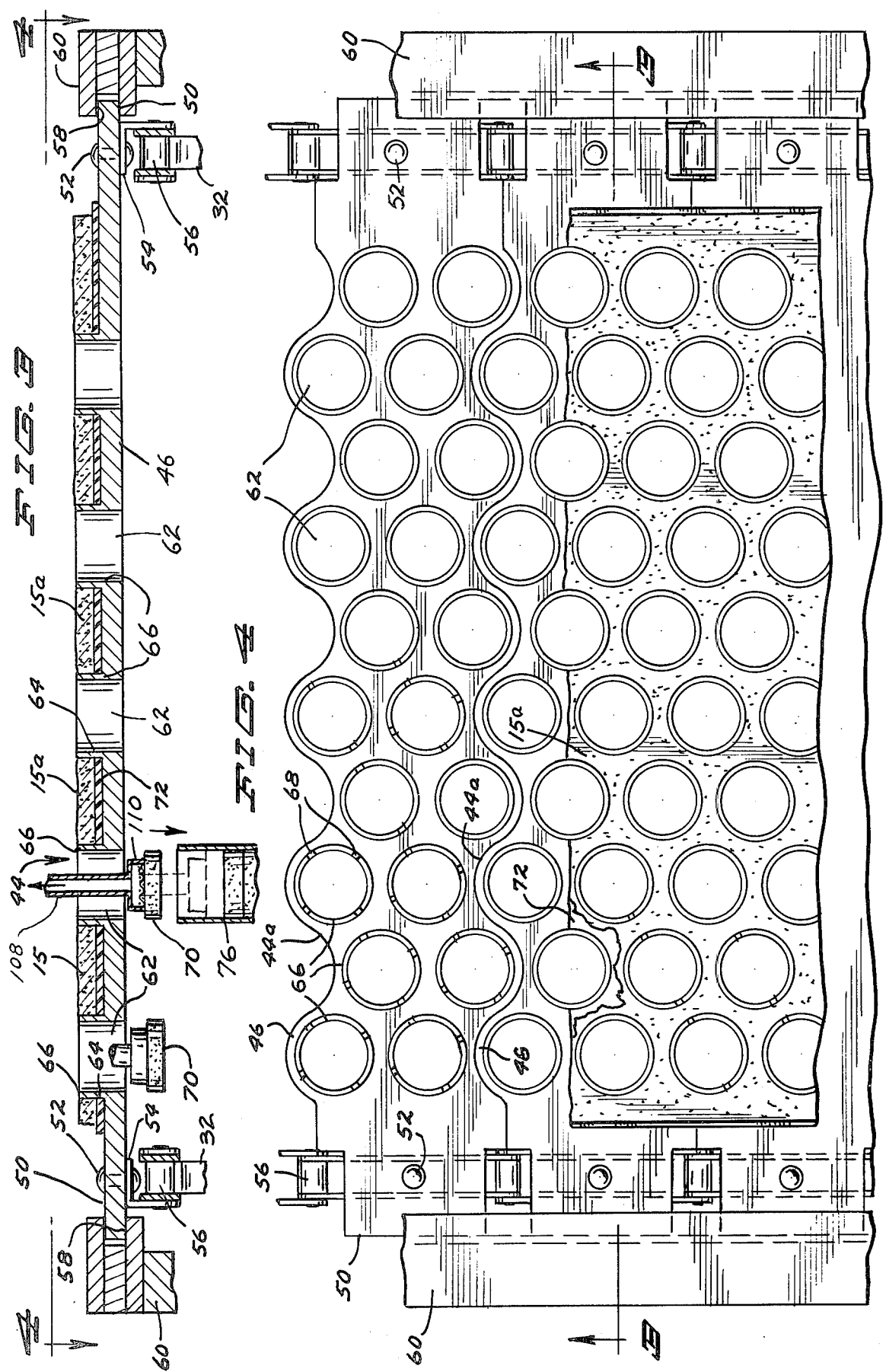

TRIM REMOVAL BELT FOR DOUGH CUTTING APPARATUS

FIELD OF THE INVENTION

The invention relates to dough processing equipment and more particularly to equipment used for continuously cutting an elongated or endless dough strip into pieces and for removing the trim which remains after the cut pieces have been removed.

DESCRIPTION OF THE PRIOR ART

The present invention has to do with a shortcoming of the dough cutting equipment described in U.S. Pat. No. 2,707,922. In this machine an elongated or endless strip of dough is pressed onto ring shaped cutters which extend upwardly from the upper run of an endless cutter that also functions as a conveyor for advancing the sheet. In most cases, the dough that remains after the pieces are removed (the trim) is sufficiently strong so that it can be collected rather easily and returned for remixing. However, in the case of relatively fragile or sticky dough especially dough of the kind that is used in cornbread, the tensile strength is so low that it is difficult to pull the dough out from between the cutting rings. Accordingly, the general object of the invention is to find a way to reliably remove the fragile and sometimes sticky dough trim from between the cutting rings of an endless dough cutter used in continuous processing.

In the course of development of the invention it was discovered that a perforated belt could be used for removing the trim. A steel belt formed from sheet metal is, however, relatively difficult to bend over the small radii required. It was also discovered that splicing and tension maintenance is a problem if satisfactory performance is to be obtained over a long period of time to be more specific, it was found that because the cutting rings engage the belt like the teeth of a sprocket engage a chain, they sometimes snag the belt causing it to double back on itself and break at the point where the belt is lifted from the surface of the conveyor.

THE OBJECTS

In view of these and other deficiencies of the prior art, the primary objects of the invention are: (a) a provision for reliably removing fragile or sticky dough from the interstices between the cutting rings used for cutting dough pieces from a continuously advancing dough sheet, (b) a provision for enabling the dough cutting rings to disengage the trim removal belt without snagging to prevent damage to the belt, (c) provision for maintaining satisfactory belt flexibility, (d) a reliable provision for splicing the ends of the belt.

THE FIGURES

FIG. 3 is a transverse sectional view taken on line 3 — 3 of FIG. 4, and

FIG. 4 is a partial plan view of the cutting conveyor and trim removal belt.

SUMMARY OF THE INVENTION

The invention deals with a new trim removal system for equipment used in cutting biscuits from a continuously moving strip of dough. The apparatus includes an endless cutting means and supporting conveyor positioned beneath the advancing dough sheet. Ring-shaped cutters project upwardly from the conveyor. As the dough sheet is advanced it is pressed onto the rings. A biscuit size piece is pressed through the center of each ring. The trim removal belt has a multiplicity of holes of just the proper size to fit over the rings so that the upper run of the belt rests in contact with the upper side of the conveyor.

In a preferred form of the invention, means is provided for bringing a belt into engagement with the upper run of the conveyor at an oblique angle and for raising the belt and the trim from the surface of the conveyor at an oblique angle. The trim thus removed and is then returned for remixing with fresh dough.

A preferred embodiment will now be briefly described. In its preferred form, the apparatus includes a supporting framework upon which are mounted at least a pair of spaced apart sprocket sets that support the endless cutting means. A provision is made for feeding the dough strip onto the upper edges of the cutting rings and a presser means is provided for forcing the dough strip onto the cutting rings to cut a dough piece from the center of each ring. The stripping belt is formed from flexible sheet material and is positioned to lie in the interstices between the cutting rings on the surface of the cutting means. The belt is brought into engagement with the cutting means prior to the point in which the dough is pressed thereagainst. Support means is provided for the ends of the loop formed by the stripping belt and means is provided operable with the belt to cause the belt to engage the cutter at a predetermined point. Means is also provided for lifting the stripper belt together with the trim from the cutter after the cut pieces of dough have been removed from the trim.

In the preferred embodiment, at least two guides are mounted at spaced apart locations on the framework in position to engage the inside surface of the belt. The guides can be moved further apart or closer together to change the tension on the stripper belt. Rotatable pressing elements are positioned centrally with respect to the guides to hold the stripping belt in engagement with the conveyor at two predetermined points to define a first obliquely inclined stripping belt section approaching the conveyor at one end thereof and a second oblique belt section retreating from the conveyor at the other end. The central ends of the oblique section engaging the conveyor are located centrally of the lines along which the conveyor is tangent to its supporting sprockets.

A DESCRIPTION OF THE PREFERRED EMBODIMENT

Figure 1:
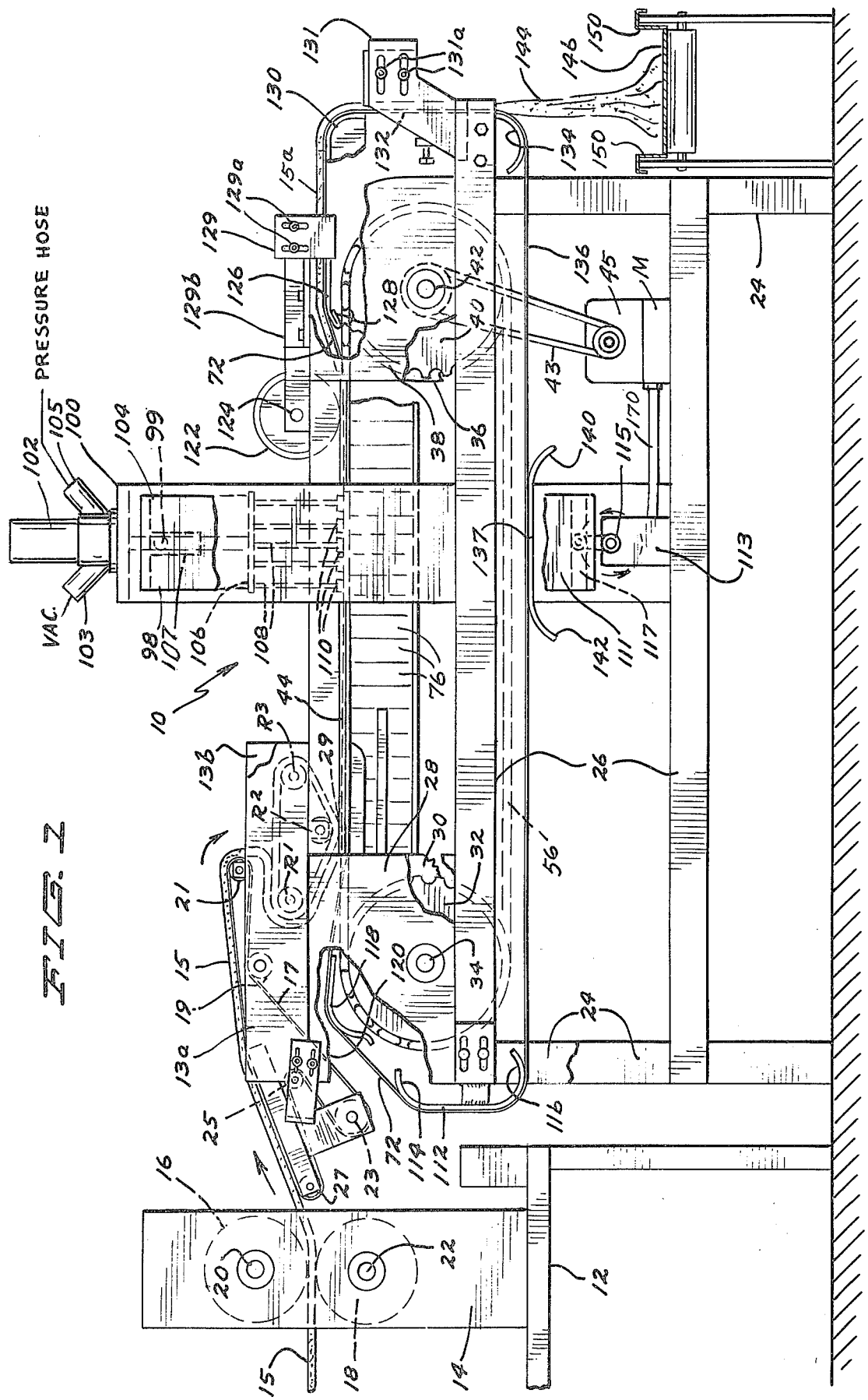
FIG. 1 is a side elevational view of a dough cutting apparatus embodying the invention.
Figure 2:
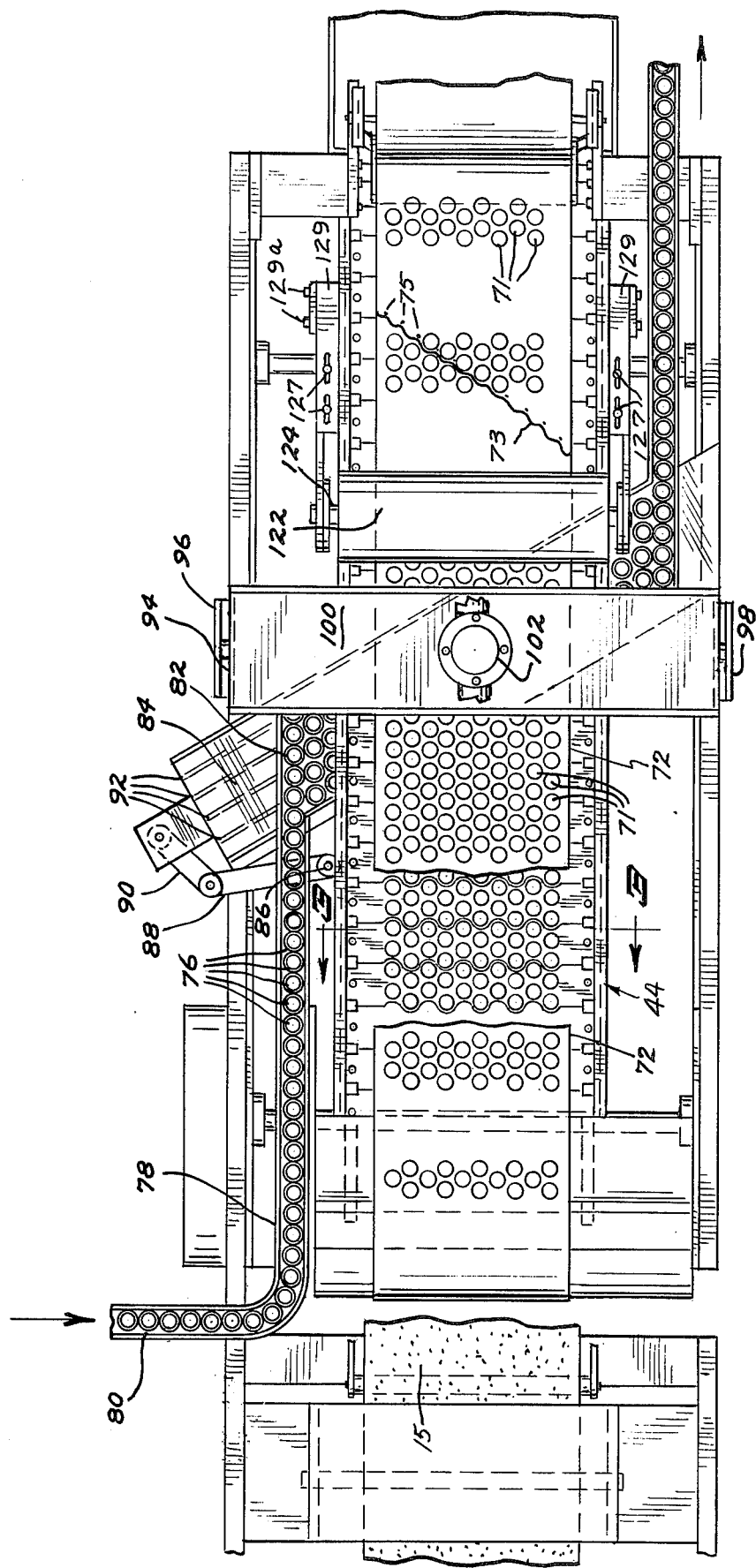
FIG. 2 is a plan view of the dough cutter of FIG. 1.

In FIGS. 1 and 2 the dough cutting apparatus is indicated generally by the numeral 10. The cutter 10 is positioned adjacent to a roll stand 12 provided with an arbor on which are mounted vertically spaced horizontal driven powered rolls 16 and 18 between which the dough strip 15 passes from left to right. The dough strip 15 travels from the roll stand 12 upwardly at a shallow inclined angle e.g. 15° on an infeed conveyor 17 which is supported on rolls 19, 21, 23, 25, and 27. The infeed conveyor 17 and its rolls are supported by side plates including two parallel vertically disposed plates 13a and 13b which are fastened to the framework of the cutter 10. The infeed conveyor is driven suitably as by an electric motor (not shown). From roll 21 the dough strip 15 falls onto a presser belt 29 entrained over rolls $R^1$, $R^2$, and $R^3$ also mounted for rotation between the plates 13a and 13b. The dough travels a short distance toward the left at first on the presser belt 29 and is then pressed onto the rings of the dough cutter by the portion of belt 29 below the roll $R^2$.

The dough cutter 10 is supported by a framework made up of vertical posts 24 and cross member 26 suitably joined together as by welding. A pair of parallel plates 28 and 30 at the left-hand side of the apparatus support a sprocket set 32 journaled at 34 for rotation on plates 28 and 30. Similarly, at the right-hand side of the apparatus are vertical plates 36 and 38 between which is a sprocket set 40 journaled at 42. The sprocket sets 32 and 40 are driven by a driving element including a chain 43 connected to an intermittent drive 45 which is in turn driven by a motor M.

Entrained over the sprocket sets 32 and 40, each of which consists of two laterally spaced sprockets are drive chains 56. Cutter bars or plates 46 that with the chains 56 define a cutter conveyor 44 are secured to the chains by bolts 52 and brackets 54. Projecting laterally beyond the side edges of the drive chains 56 are end portions 50 which extend into recesses 58 of a stationary guide 60 secured on each side of the framework 24 – 26. Thus, as the chains 56 advance, the ends 50 slide in the guides 60 thereby supporting the plates 46 at the proper elevation.

Each cutter bar 46 is provided with a multiplicity of dough cutting rings 66 which extend upwardly a sufficient distance e.g. ¾ inch to cut through the dough sheet 15 producing biscuit size pieces 70 as the dough sheet 15 is forced against the cutting rings 66 by belt 29. The dough pieces are held in place temporarily by dough ligaments that extend through two pairs of diametrically opposed slots 68 (FIG. 4) only a few of which are shown.

The cut dough pieces 70 are removed from the central bore 62 of the cutters by depositor heads 110 mounted at the lower end of supporting tubes 108. The depositor heads 110 are lowered and raised during operation while bores 62 are in alignment beneath the depositors by means of two crank arms 115 (only one of which is shown in FIG. 1) having rollers at their free ends engaged in slots 117 at the lower end of plunger support plates 96 and 98 respectively on either side of the apparatus. A horizontal rod 99 joins the plates 96 and 98 rigidly to a plunger support 106 upon which all of the plungers are mounted. Either vacuum or pressure is supplied to the plungers from lines 103 and 105 respectively, as controlled by a valve 102 which communicates with the tubes 108 and plunger heads 110 through telescoping pipe 107. The vacuum supplied through line 103 holds the cut pieces 70 on the ends of the plungers until they have reached their lowermost position at which time the pressure supplied through hose 105 frees the cut pieces from the plunger end. The valve 102 is suitably connected to the drive motor to operate in timed relationship with the drive motor M.

The trim removal belt 72 is formed from a long sheet of flexible material such as metal or plastic. In a preferred form of the invention, the belt comprises a laminated Mylar* sheet which is cut along a diagonal line defining cut ends 73 at each end. The belt 72 can for example be .014 Mylar or .028 laminated Mylar. The cut ends 73 are brought into overlapping relationship and bonded together as by means of plastic rivets 75.

The belt is engaged with the top run of the conveyor 44 and passes first over a smooth surfaced sheet metal guide 118 affixed to plates 28 and 30 above sprocket set 32. The belt then travels downwardly and toward the right engaging the conveyor 44 at a shallow oblique angle, e.g. 15°. Openings 71 in the belt 72 are of just the proper size and spacing to be engaged over the upwardly extending cutter rings 66. From the guide 118 the belt passes toward the right in the figures. Motion is imparted to belt 72 by the conveyor 44.

* Registered Trademark of the DuPont Company

Cans 76 supplied to the apparatus are open at the top as seen in FIG. 2. They enter a guide 78 from a supply 80 and are fed to a conveyor 82 that passes beneath the plunger 110. Power is supplied from the main drive motor M (FIG. 1), sprockets 86 and chain and sprocket assembly 88 and 90 to parallel endless conveyor elements 92 that contain magnets engagable with the steel bottom covers of the cans 76 for advancing them to the right as seen in FIG. 2 beneath the plungers 110. The cans are positioned immediately below the conveyor 44 as seen in FIG. 1 to receive the cut dough pieces.

FIGS. 1 and 2 illustrate the trim 15a which remains after the cutting operation and the removal belt 72 passing below an idler roller 122 supported for rotation upon a shaft 124. They then travel upwardly on a gradual incline to the top of a guide plate 126 having a rounded forward end 128. The roll 122 assures that the trim removal belt is in engagement with the cutter bars at the point where it passes beneath roll 122. In this way there is assurance that the belt 72 will begin to move away from the cutter at a predetermined point. The vertical height of the trim at 126 and belt 72 is regulated by moving the guide up or down on bracket 129 and appropriately tightening bracket nut 129a. Similarly, the longitudinal position of roller 122 can be controlled by sliding it to the left or right as seen in FIG. 2 and tightening nuts 127. In this way, the angle of incidence of the belt 72 with respect to conveyor 44 can be selectively changed as needed. The guide 126 lifts the belt 72 and the trim and supports it as it moves toward the right to a point where the trim can be returned for recycling.

From the guide plate 126 the belt together with the trim 15a travel toward the right over a curved sheet metal support and guide 132 having an upper curved portion 130 which extends toward the left as seen in the figures, a vertically disposed center section and a lower portion 134 which curves toward the left. The guide 132 provides a smooth support surface for the belt and also serves as a tension adjustment by the provision of mounting bolts 131a which project through a mounting bracket 131 affixed to each side of the apparatus (only one of which is shown in the FIG. 1). By loosening the bolts 131a and moving the guide 132 toward the right, the belt 72 will be tightened, by moving it toward the left the belt will be loosened. In this way the belt tension can be selectively adjusted. The alignment of the openings 71 in belt 72 with the cutting rings is also adjusted by sliding the guide 132 on the bracket 131 and thereafter tightening the bolts 131a.

The trim material 15a falls from the belt 72 as shown at 144 onto a transfer conveyor 146 with side walls 150 that returns it for mixing with fresh dough. From the lower end of the guide 132, the transfer conveyor travels toward the left along a horizontal run 136 then travels around the outside surface of an additional curved metal guide 112 having an upper portion 114 curved toward the right and a lower portion 116 curved toward the right. The lower run 136 of the belt 72 is supported by sheet metal member 137 having downwardly curved ends 140, 142 to provide a smooth support for the belt.

During operation, the cans 76 flow continuously onto the conveyors 92 and are carried beneath the plungers 110. In operation, the reciprocation of the plungers 110, bar 99, and the plates 96 and 98 goes on continuously due to the rotation of the crank arm 115. A shaft 170 extending between a gear box 113 of the cranks 115 and motor M supplies power to the cranks and coordinates the intermittent motion of intermittent drive 45 with a crank arm movement so that the openings 62 are in alignment with plungers 110 when the plungers descend and remain so until the plungers again travel back out of the cans and pass upwardly through the openings 62.

It can thus be seen that belt 72 removes the trim material 15a from the interstices between the cutting rings even though the dough is quite sticky and the trim is and continuously advanced to a place where it can be returned for remixing. In addition, the trim removal belt will engage and disengage the dough cutting rings without being injured or snagging the rings.

Three major factors contribute to the effective engagement and disengagement of the trim removal belt with the conveyor belt 44 as follows: (a) provision for introducing the belt and removing the belt from the conveyor at a shallow angle preferably less than 45° and in the preferred form of the invention at an angle of about 15°, (b) provision for controlling the tension of the belt 72 and finally, (c) provision for engaging and disengaging the belt from the conveyor between the points at which the conveyor 44 becomes tangent to the driving sprockets since the edges of bars 46 tilt with respect to one another as the cutter rings on either side of the separation lines 44a which would of course fracture the belt if the belt were then in engagement with the cutter. Because the belt is formed preferably from plastic resinous material such as laminated plastic film it has sufficient flexibility to pass readily around the guides at each end.

Some of the details in construction and operation of the dough cutter and inserting mechanism will be better understood by reference to U.S. Pat. No. 2,707,922 which is incorporated herein by reference.

I claim:
1. An apparatus for cutting bakery goods from an elongated strip of dough, said apparatus comprising a supporting framework, an endless cutting means including a cutting surface member having openings therein, upwardly extending cutting rings around the openings, means for feeding the dough strip onto the top of the cutting rings, means for pressing the dough onto the cutting rings to cut a dough piece from the center of each ring, an endless trim stripping belt comprising flexible sheet material in engagement with the cutting surface member and positioned around the rings in the interstices between the rings on the surface of the cutting means, support means for the belt and means operable with the belt to cause the belt to engage said endless cutting means at a predetermined point prior to the point at which the dough is pressed thereagainst and means for lifting the belt together with the trim thereon from said endless cutting means after the cut pieces of dough have been removed from the trim.

2. The apparatus of claim 1 wherein the support means for the stripping belt includes at least two guides mounted at spaced apart locations upon the framework in position to engage the inside surface of the stripper belt at spaced points whereby the spacing between the guides can be changed to regulate the tension on the stripping belt.

3. The apparatus of claim 1 wherein first and second longitudinally spaced guide members are mounted on the supporting framework above the conveyor at each end of the conveyor and a pair of longitudinally spaced rotatable pressing elements are positioned between the guide members to hold the stripping belt in engagement with the conveyor at two predetermined longitudinally spaced laterally extending lines to define a first oblique stripping belt section approaching the conveyor at one end thereof and a second oblique section retreating from the conveyor at the other end thereof.

4. The apparatus of claim 3 wherein the endless cutting means comprises a pair of spaced apart sprocket sets, endless chains entrained over the sprocket sets, cutting bars mounted to extend transversely between the chains and said two lines are located between those areas where the chains are in contact with said sprockets.

5. The apparatus of claim 1 wherein the trim stripping belt is formed from a flat sheet of plastic resinous material.

6. The apparatus of claim 5 wherein the belt comprises a resinous polyester plastic laminate having cut ends, said cut ends being positioned in lapped relationship and being rivited together.

7. An apparatus for cutting bakery goods from an elongated strip of dough, said apparatus comprising a supporting framework, and endless cutting means including a cutting surface member having openings therein, upwardly extending cutting rings around the openings, means for feeding the dough strip onto the top of the cutting rings, means for pressing the dough onto the cutting rings to cut a dough piece from the center of each ring, an endless trim stripping belt comprising flexible sheet material in engagement with the cutting surface member and positioned around the rings and in the interstices between the rings on the surface of the cutting means prior to the point at which the dough is pressed thereagainst, support means for the belt and means operable with the belt to cause the belt to engage the cutter at a predetermined point and means for lifting the belt together with the trim thereon from the cutter after the cut pieces of dough have been removed from the trim, the support means for the stripping belt including at least two guides mounted at spaced apart locations upon the framework in position to engage the inside surface of the stripper belt whereby changing the spacing between the guides can be used to change the tension on the stripping belt, first and second guide means mounted on the supporting framework above the conveyor at each end of the conveyor, rotatable pressing elements positioned between the first and second guide means to hold the stripping belt in engagement with the conveyor at two predetermined points to define a first oblique stripping belt section approaching the conveyer at one end thereof and a second oblique section retreating from the conveyor at the other end thereof.

8. An apparatus for cutting bakery goods from an elongated strip of dough, said apparatus comprising a supporting framework, an endless cutting means including a cutting surface member having openings therein, upwardly extending cutting rings around the openings, means for feeding the dough strip onto the top of the cutting rings, means for pressing the dough onto the cutting rings to cut a dough piece from the center of each ring, an endless trim stripping belt comprising flexible sheet material in engagement with the cutting surface member and positioned around the rings in the interstices between the rings on the surface of the cutting means prior to the point at which the dough is pressed thereagainst, support means for the belt and means operable with the belt to cause the belt to engage the cutter at a predetermined point and means for lifting the belt together with the trim thereon from the cutter after the cut pieces of dough have been removed from the trim, the endless cutting means comprises a pair of spaced apart sprocket sets, endless chains entrained over the sprocket sets and cutting bars mounted to extend transversely between the chains, the trim stripping belt is formed from a sheet of a resinous polyester plastic laminate having cut ends, said cut ends being positioned in lapped relationship and being rivited together.

9. The apparatus of claim 8 wherein the support means for the stripper belt includes at least two guides mounted at spaced apart locations upon the framework in position to engage the inside surface of the stripper belt at spaced points and means for changing the spacing between the guides to regulate the tension on the stripper belt.

10. The apparatus of claim 9 wherein a pair of longitudinally spaced guide members are mounted on the supporting framework above the conveyer at each end of the conveyor and a pair of longitudinally spaced rotatable pressing elements are positioned between the guide means to hold the stripping belt in engagement with the conveyor at two predetermined longitudinally spaced laterally extending lines defining a first oblique stripping belt section approaching the conveyor at one end thereof and a second oblique section retreating from the conveyor at the other end thereof.

11. The apparatus of claim 8 wherein a second conveyor is positioned in below one end of the trim stripping belt to receive the trim removed by the belt and to carry the trim to a remote location for remixing with fresh dough.

* * * * *